(12) United States Patent
MacMillan et al.

(10) Patent No.: US 8,812,364 B2
(45) Date of Patent: *Aug. 19, 2014

(54) METHOD AND APPARATUS FOR PUBLISHING LITERATURE

(76) Inventors: Andrew Terrance MacMillan, Calgary (CA); Ryan Tracy Smith, Guelph (CA)

( * ) Notice: Subject to any disclaimer, the term of this patent is extended or adjusted under 35 U.S.C. 154(b) by 326 days.

This patent is subject to a terminal disclaimer.

(21) Appl. No.: 12/860,912

(22) Filed: Aug. 22, 2010

(65) Prior Publication Data

US 2010/0318431 A1  Dec. 16, 2010

Related U.S. Application Data

(63) Continuation of application No. 12/036,234, filed on Feb. 23, 2008, now Pat. No. 7,809,606.

(51) Int. Cl.
*G06Q 30/00* (2012.01)

(52) U.S. Cl.
USPC .................................. 705/14.69; 705/1.1

(58) Field of Classification Search
USPC .................................. 705/1, 14.69
See application file for complete search history.

(56) References Cited

U.S. PATENT DOCUMENTS

| | | | |
|---|---|---|---|
| 7,165,070 B2 * | 1/2007 | Page et al. ............................. | 1/1 |
| 7,328,166 B1 * | 2/2008 | Geoghegan et al. ............... | 705/5 |
| 7,617,121 B1 * | 11/2009 | DeMayo et al. ........... | 705/14.26 |
| 2002/0064766 A1 * | 5/2002 | Cozens et al. ................ | 434/350 |
| 2002/0083089 A1 * | 6/2002 | Piccionelli ..................... | 707/500 |
| 2002/0107735 A1 * | 8/2002 | Henkin et al. .................. | 705/14 |
| 2002/0120505 A1 * | 8/2002 | Henkin et al. .................. | 705/14 |
| 2002/0120635 A1 | 8/2002 | Joao | |
| 2003/0101413 A1 * | 5/2003 | Klein et al. ................... | 715/513 |
| 2005/0114227 A1 * | 5/2005 | Carter et al. .................... | 705/26 |
| 2007/0050419 A1 * | 3/2007 | Weyl et al. .................... | 707/200 |
| 2007/0192181 A1 * | 8/2007 | Asdourian ...................... | 705/14 |
| 2007/0192279 A1 * | 8/2007 | Van Luchene .................... | 707/1 |
| 2007/0219940 A1 * | 9/2007 | Mueller et al. .................... | 707/1 |
| 2008/0033923 A1 * | 2/2008 | Van Luchene .................... | 707/3 |
| 2008/0033924 A1 * | 2/2008 | Van Luchene .................... | 707/3 |
| 2008/0294524 A1 * | 11/2008 | Badros et al. .................... | 705/14 |

OTHER PUBLICATIONS

"Let's get the word out", http://www.letsgetthewordout.com.

* cited by examiner

*Primary Examiner* — Traci Casler

(57) ABSTRACT

A method of publishing a work of literature on a network includes transmitting a published portion of the work of literature to a device via the network. The published portion includes an indication that a keyword has been sold to a purchaser for at least one appearance of the keyword in the published portion. The method also includes adding a new installment to the published portion, and updating the published portion to include the indication that the keyword has been sold for at least one appearance of the keyword in the new installment at no additional monetary cost to the purchaser of the keyword.

20 Claims, 9 Drawing Sheets

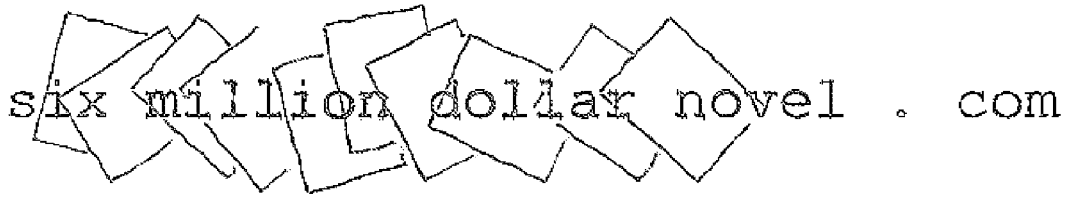

:very word in this novel is for sale. Buy a word and help two struggling writers achieve their dream. Each an(
: to your site. It's our novel, but they're your words. Limited supply—act fast before they're all gone. Hey, yc
amous. We're just a couple of nobodies.

| READ THE NOVEL | BUY A WORD! | FAQ | ABOUT | WON |

The Big Word List

All the different words in the novel are shown below. Words still available for purchase are in blue, while words already bought are shown in red.

Click any blue word to buy it.

Hover your mouse pointer over a word to see the price.

(Note: When you buy a word, you get all appearances of it in the novel regardless of font and capital/small letters. The words below are all shown in lowercase only to make our lives easier.)

A B C D E F G H I J K L M N O P Q R S T U V W X Y Z #

A a about above accident across action actual actually added afford after again against agitate airbag alex all along already always am amp an and annoyed another anti-terror anti-towel-head anybody anyone anything anyway approaching arabs are arrive as aside asked at attempted avoid away

B baby back bad bag baker band's bashed basketball be bear became because bed been before behind beige being bellhop bellhops belongings besides best better big biggest bin-diving binoculars bit block blue bomb-making borrowed boss both break breather breathing brew broke broken bucket busting but by

C calling camera can can't car card carpet cars case cassidy catch caught

Fig. 3

Every word in this novel is for sale. Buy a word and help two struggling writers achieve their dream. Each and it to your site. It's our novel, but they're your words. Limited supply—act fast before they're all gone. Hey, yo famous. We're just a couple of nobodies.

| READ THE NOVEL | BUY A WORD! | FAQ | ABOUT | MORE |

The 3 appearances of *accident* in the novel so far (Buy it now)

Chapter 1

...on the action for his usual twenty-five percent. "The hardest part was deciding who to go after, the band's insurer or the hotel's. The accident was easy by comparison. A plush carpet runner tacked to varnished hardwood stairs. Couldn't have asked for a better setup. I wanted to make ...

...those dirty hippies pay, but my doc figured the hotel had deeper pockets." When Ramon did things, he did them with heart. After the accident, he installed hand controls in his van. Did the work himself, against doctor's orders of course. He borrowed a wheelchair from outside the emergency ...

...known Ramon for five minutes. Some of the other bellhops had gone out for a few rounds in his honor the night after the accident, and one of them got his face bashed in by a drunk. The ER nurse slipped a disc helping lift him into bed. It ...

Buy *accident* now, and we'll include all future appearances of *accident* at no extra cost!

...or pick another word.

Fig. 4

Every word in this novel is for sale. Buy a word and help two struggling writers achieve their dream. Each an(
it to your site. It's our novel, but they're your words. Limited supply—act fast before they're all gone. Hey, yc
famous. We're just a couple of nobodies.

| READ THE NOVEL | BUY A WORD | FAQ | ABOUT | WORI |

Buy *above*

The 1 appearance of *above* in the novel so far (show me where) costs $100. This price includes all future appearances of *above* in the novel.

What you get

- A link to your Web site on all appearances of *above* (independent of font and small/capital letters) in the novel text
- One blurb of mouse-over text for all your links (255 characters maximum)
- Your name or company name, your mouse-over blurb, and your word (linked to your Web site) on the word owner list, which is sorted by purchase price
- An endnote in the paper version of the novel published via a print-on-demand service shortly after completion of the novel. The endnote will be on the first appearance of your word and will contain your name or company name, your Web site domain name or URL, and the price you paid
- Loads of targeted traffic to your Web site for years to come!

What you need to do

1. Enter your information using the form below
2. Pay within 12 hours (Payment instructions on next page)

name (your name, company name, hax0r name, whatever)

Andrew MacMillan e-mail address words@sixmilliondollarnovel.com confirm e-mail address words@sixmilliondollarnovel.com

Web site address (for your links)

www.sixmilliondollarnovel.com mouse-over text (maximum 255 characters)

I would like to welcome you to read my free novel.

I agree to the terms and conditions
(listed in the panel on the right)

Fig. 5

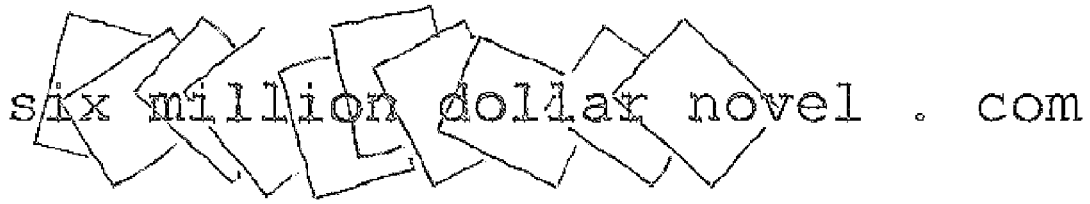

Every word in this novel is for sale. Buy a word and help two struggling writers achieve their dream. Each and it to your site. It's our novel, but they're your words. Limited supply—act fast before they're all gone. Hey, you famous. We're just a couple of nobodies.

| READ THE NOVEL | BUY A WORD! | FAQ | ABOUT | WORD |

Buy *above*

Please make payment within 12 hours.

1 appearance of *above* in the novel so far and all future appearances of *above* in the novel.

Price: $100

Fig. 6

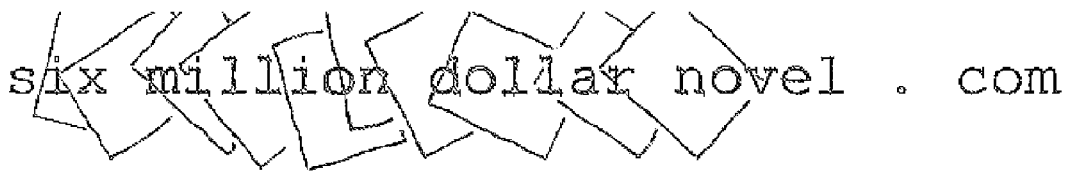

Every word in this novel is for sale. Buy a word and help two struggling writers achieve their dream. Each and
it to your site. It's our novel, but they're your words. Limited supply—act fast before they're all gone. Hey, yo
famous. We're just a couple of nobodies.

| READ THE NOVEL | BUY A WORD! | FAQ | ABOUT | WORD |

Buy *above*

> Already Reserved: This word has already been reserved by someone else and
> we are currently awaiting payment. You can still request this word if you like and we
> will e-mail you if the current reservation falls through, or you can choose another
> word.

The 1 appearance of *above* in the novel so far (show me where) costs $100. This price
includes all future appearances of *above* in the novel.

What you get

- A link to your Web site on all appearances of *above* (independent of font and small/capital letters) in the novel text
- One blurb of mouse-over text for all your links (255 characters maximum)
- Your name or company name, your mouse-over blurb, and your word (linked to your Web site) on the word owner list, which is sorted by purchase price
- An endnote in the paper version of the novel published via a print-on-demand service shortly after completion of the novel. The endnote will be on the first appearance of your word and will contain your name or company name, your Web site domain name

What you need to do

1. Request *above* using the form below
2. Check your e-mail for a message from us if this word becomes available
3. Pay within 12 hours of this word becoming available name (your name, company name, hax0r name, whatever)

[                    ]

e-mail address

[                    ]

confirm e-mail address

[                    ]

Web site address (for your links)

[www.                ]

Fig. 7

Main menu
Changes saved.

Order #69

Word: above
Order date: 2008-02-13 00:02:07
IP address: 219.84.84.84
State: ○ Pending ○ Rejected ○ Blocked ⦿ Reserved ○ Expired ○ Purchased
Price: 100
Name: Andrew MacMillan
E-mail: words@sixmilliondollarnovel.com
Description: I would like to welcome you to read my free novel.
URL: www.sixmilliondollarnovel.com
Reserved Date: 2008-02-13 00:02:07
Purchase Date:

METHOD AND APPARATUS FOR PUBLISHING LITERATURE

CROSS REFERENCE TO RELATED APPLICATIONS

This application is a continuation and claims the benefit of priority of prior U.S. patent application Ser. No. 12/036,234, filed Feb. 23, 2008, which is incorporated herein by reference.

FIELD OF THE INVENTION

The invention relates to publishing literature, and more particularly, to a method and apparatus for publishing literature on a computer network.

BACKGROUND

In the world of literature, the publishing industry is driven by what the market is willing to pay to read. Publishers receive manuscripts from authors or agents and do their best to determine what will sell. What publishers believe will sell is published; what won't is rejected.

As anyone who has submitted a manuscript to a publisher knows, determining what will sell is largely subjective. In many cases, an editor familiar with the market reads a synopsis or skims part of the manuscript, and then makes the decision. Despite the editor's experience, this kind of subjectivity can lead to errors. Hemingway is famous for rejections, and the editors who rejected him must have been pretty embarrassed after he became successful. The Hemingway circumstance teaches us that the so-called slush pile (publishing jargon for the literal pile of unsolicited manuscripts to be reviewed) contains many manuscripts that the public wants to read but will never see the light of day. Why? Because editors are human and therefore imperfect.

Publishers sometimes miss gems, but they make up for this with their remarkable ability to market books, even ones that should have never crawled off the slush pile in the first place. Publishers know how to get books reviewed and arrange book signings and author appearances. Drumming up publicity for a book launch has become the publisher's forte, perhaps at the cost of objectively assessing the strengths and weaknesses of manuscripts.

Self-publishing is an alternative to the traditional publishers described above. When the author and publisher are one and the same, acceptance of a manuscript is virtually guaranteed. However the major problem here is that self-publishers do not, as a rule, do a good job of marketing. Their motto: if I write it, they will buy. The sad truth is you can count the number of successful self-published books on your fingers.

The electronic book (e-book), often found for sale via a Web site on the Internet, is another form of self-publishing. Being virtual, e-books do not incur production costs and require little if any initial investment; however, it is exactly these advantages that cause readers to doubt the quality of e-books. Since anybody can create an e-book, readers will not normally be willing to risk purchasing an e-book unless they are already familiar with the author. Additionally, e-books that are readable only after purchase tend to be shared illegally online between users without payment to the author. In a further blow to e-books, allowing users to read for free and asking for payment only if the user is satisfied with the quality has typically failed to produce significant revenue —even for otherwise highly successful authors. For example, Stephen King attempted to bypass his publisher and sell the serial novel "The Plant" directly to readers on his Web site. He promised to keep writing chapters until the story finished as long as readers kept paying for it. However, a mere 46% of the people who downloaded the novel paid for it, and King has since abandoned the novel after only the sixth chapter due to lack of sufficient payment from readers.

The gap between traditional publishing and self-publishing needs to be filled by a new type of publishing that minimizes the disadvantages of both while amplifying their advantages.

SUMMARY OF THE INVENTION

The inventors of the present invention have conceived and reduced to practice a novel method and apparatus for publishing a work of literature on the Internet, as defined by the appended claims.

BRIEF DESCRIPTION OF THE FIGURES

FIG. 3 is a list of keywords available for purchase in the novel of FIG. 2 being ordered alphabetically.

FIG. 4 shows examples of the appearances of the keyword "accident" in the novel of FIG. 2.

FIG. 5 illustrates a form for making a purchase request of a keyword in the novel of FIG. 2 by a purchaser.

FIG. 6 is a confirmation of the purchase request of FIG. 5 and shows instructions for how to make payment after receiving the purchase request.

FIG. 7 is a request word page displayed when trying to purchase a word in the novel of FIG. 2 that has already been reserved by someone else.

DETAILED DESCRIPTION

Figure 1:
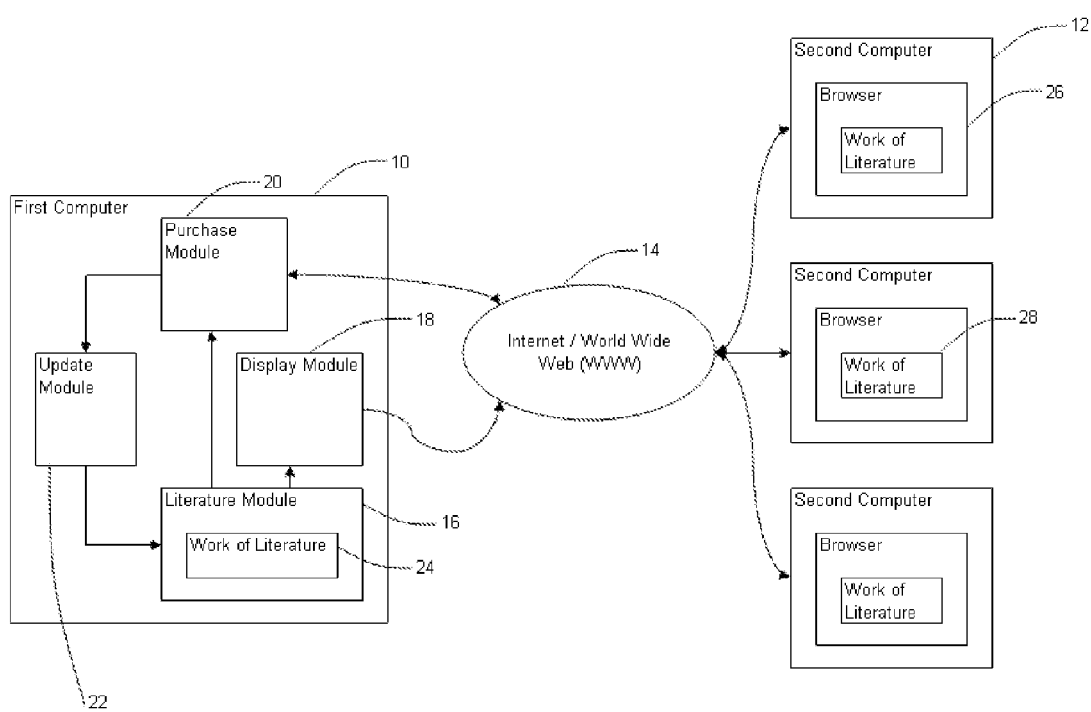
FIG. 1 is a schematic diagram of an embodiment of the invention.

Before getting into the details, we'd just like to outline the basic gist of the invention. In our invention, when a work of literature is published on the World Wide Web (WWW), the work is available to read for free from other computers and each word of the work becomes available for purchase. When a word is bought, the work is updated to add an indication that the word has been purchased such as a hyperlink to the purchaser's Web site and/or mouse-over-text on the word, for example. Purchasers include people with Web sites they want to promote, other advertisers of all forms, or just people with statements to make. The fact that the market determines the profit of the work is one way the invention improves the whole publishing process. The more popular a work becomes, the more advertisers will want to purchase words, and therefore, the more money the work will earn. Good works are rewarded, bad ones are not. The market directly rewards authors.

In this disclosure, a work of literature is defined as any work of fiction or non-fiction, such as a novel, a short story, a poem, a biography, a memoir, a travel book, a how-to book, a self-help book, or a piece of corporate literature, for example. Many of these different forms of literature have been published online for years. Of particular interest to the invention are the fiction forms, as these are less widely published online and much more prone to subjective opinion. For example, non-fiction hot-to books have coarse degrees of usefulness, such as useful, moderately useful, worth a skim, virtually useless, and waste of trees. Fiction, on the other hand, is useful in the way that art is useful. The works of Tom Clancy may be considered trash by person A, while he may be seen as quite sophisticated to person B. Person A may prefer fiction of a more artistic bent, such as lesser known authors that explore the depths of human suffering, write in quirky dialects, or invent religions (e.g., the late Kurt Vonnegut). In short, literature more susceptible to subjective opinion is better suited for publication via this invention. That's not to say that a boring list of functional instructions cannot be published using this invention. Not at all. The point is that the inventors anticipate that fiction and creative non-fiction will earn more money because these forms are generally more interesting to read and less commonly used as a medium for advertising.

When we talk about a "work" in this disclosure, we mean a work of fiction or non-fiction made up of words. The work can be either complete or incomplete. This disclosure is an example of a work, as is claim 1. A work can be published in installments, such as a series of chapters. It can also be published all at once. The work can be a new work published for the first time, or something that has been published before.

The words of the work make up what we call keywords. They can do this individually, such that each word is a keyword; or as phrases, such that a combination of words makes up a keyword. A mix of these approaches is also acceptable. Every word in the work or every combination of words in the work can be treated as a keyword, though some words may be omitted if desired. Keywords can also be defined a number of adjacent words in the work, or of adjacent words having or not having particular punctuation between them. For example, keywords could be defined as words having hyphens between them, or not having periods between them. The more keywords the better, since, as in retail, the more products you have on the shelf, the more you can sell. In one embodiment, the keywords of the work are all unique and therefore different from each other. In this way, there may be many occurrences or appearances of a particular keyword in the work. For example, the word "marketing" could be a single keyword that appears seven times in the work.

FIG. 1 shows an overall schematic of an embodiment of the invention.

A first computer 10 is connected to a bunch of second computers 12 via the Internet 14 or other computer network.

The first computer 10, which may be called a server, includes a literature module 16, a display module 18, a purchase module 20, and an update module 22. The modules 16-22 are all interconnected, with the arrowheads illustrated indicating the general flow of information but without restricting information backflow in any way. The modules 16-22 can be defined in other ways and can be combined or further segregated. We chose to organize them as the way we did to make this disclosure easy to understand. As one can imagine, computer programmers have at their disposal a myriad of ways of modularizing their code. Additionally, the modules 16-22 could be implemented in hardware and integrated onto a circuit board or chip of the computer 10.

The literature module 16 stores a work of literature 24. The work is made of a plurality of keywords, with purchased keywords having an indication that they have been purchased such as hyperlinks being associated with them. This can be achieved by a hypertext markup language (html) document. The entire literature module 16 may be an html document or group of html documents. An html document of the literature module may be a static file, meaning that it is not generated by a script (such as a PHP or Perl script) each time it's viewed. Static html files tend to have the suffix .htm or .html, whereas dynamic ones need something like .php or what have you. If a static file is used, it certainly can be generated by a script, just not each time it's viewed. That would be a dynamic file.

The display module 18 is configured to arrange the work of literature 24 for display via the Internet 14. This can be a script that accesses the literature module 16 and makes the work 24 presentable. The result is a Web page that looks nice and maybe has a navigation bar and all that along with a nice-looking version of the work or portion of the work. Let's assume the literature module 24 is a series of static html files, one for each chapter of a novel in progress. The display module 18 accesses one of the chapter files and shows that as part of a Web page, among run-of-the-mill stuff like a navigation bar and links to other pages or chapters. The display module 18 itself can be an html document. However, it's more likely that the display module 18 will have a script that builds a nice Web page from basic elements, one of such being the work 24. In this case, the script can act to include (in a programming sense, via an include or require expression) an html document of the literature module 16 in a generated html display document 28 that someone sitting at a second computer 12 can read with a Web browser 26.

The purchase module 20 is configured to receive a purchase request for a keyword via the Internet 14. The purchase request may be from someone viewing the work on one of the second computers 12. Like the other modules, the purchase module 20 can have an html document. Such an html document can list keywords available for purchase. Another html document can have a form for receiving the purchase request. The purchase request form can demand entry of a name, e-mail address, universal resource location (URL) for the hyperlink on the keyword, mouse-over-text to appear on the keyword, etc. Another thing the purchase module 20 can be configured to do is to calculate a price of a keyword. The price can be calculated in all kinds of ways. One good way is based on a keyword's frequency in the work. For example, the total price of a particular keyword could be equal to the price per occurrence multiplied by the number of appearances of the keyword in the work. Another way is by the keyword's frequency on the Internet, as determined by, say, the quantity of search engine results. For example, a particular keyword that returns 1,000,000 hits on Google TM could be double the price of another keyword that only returns 500,000 hits on Google. In this way, the price of a keyword is effectively based on the number of times each keyword appears on the Internet. The keywords can also be bundled together for sale. All appearances of a keyword can be a package deal. Similar keywords (e.g., car, automobile, SUV, and Land Rover TM) can be bundled, too. Whether to and how to bundle keywords is as much a marketing decision as a technical one.

The update module 22 is configured to update the work of literature 24. There are two kinds of updates, and both of them can be done with the update module 22. The first kind of update is adding the indication that a keyword has been purchased. For example, adding a hyperlink to a purchased keyword. In this case, the update module executes a script that associates a hyperlink with a purchased keyword. This can be realized by the script referencing a database table storing the work 24, adding the hyperlink to that table (or a related table), and generating a static file containing the new hyperlink as well as hyperlinks for previously sold words. If keywords are being sold in bundles, the script can associate a hyperlink with all appearances of the same keyword, for example.

The first kind of update occurs when a work is published in installments. In this case, when a new installment is published, it must be updated to contain hyperlinks on all the keywords previously sold.

The update module 22 can further be configured to receive an administrator's payment verification input before or after the work of literature is updated. The payment verification indicates that the keyword has been paid for.

A database can be provided as part of one or more of the modules 16-22. The database can include a table that stores keywords and further stores non-keyword elements including punctuation and spaces. Such a table can look like this:

TABLE 1

| ID | before punctuation | keyword | after punctuation | purchaser ID |
|---|---|---|---|---|
| 1 | NULL | In | [space] | 0 |
| 2 | NULL | the | [space] | 0 |
| 3 | NULL | beginning | ,[space] | 123 |
| 4 | NULL | God | [space] | 0 |
| 5 | NULL | said | ,[space] | 0 |
| 6 | " | Let | [space] | 0 |
| 7 | NULL | there | [space] | 0 |
| 8 | NULL | be | [space] | 0 |
| 9 | NULL | light | !" | 0 |

When this table is used by the update module 22 to generate work of literature 24, the update module 22 strings together the before punctuation, the keyword, and the after punctuation going through the rows in order of ID. What gets generated would look like this:

In the beginning, God said, "Let there be light!"

However, we've neglected to mention that the word "beginning" has been purchased by customer number 123. Therefore, the update module should reference another table to obtain the link and other data associated with the purchased keyword. Such table can look like this:

TABLE 2

| purchaser ID | name | hyperlink | mouse-over text | image |
|---|---|---|---|---|
| 123 | John Doe | http://www.example.com | Visit my site, please | NULL |
| 645 | Moses | http://www.example2.com | My name really is Moses | moses.jpg |

Thus, when the work of literature 24 is generated, the update module 22 inserts hyperlinks, mouse-over text, and/or images on purchase keywords. In this example, what gets generated looks like this:

In the beginning, God said, "Let there be light!"

The word beginning is a hyperlink to the Web site www.example.com. When you move your mouse over the word beginning, the text "Visit my site, please" appears. Had an image been provided and had such functionality been desired, the mouse-over function could cause the image to appear. Another way to show images is to show those images somewhere else on the screen, such as in the margin, independently of mouse over.

To illustrate the flexibility of the modules 16-22, consider a single Web page having a 2000-word short story and a form to request purchase of a word in the story. Whether static or dynamic and whether generated by a script or not, this single Web page is in fact the literature module, the display module, the purchase module, and the update module all rolled into one. Or take another example of a huge Web site composed of thousands of statically and dynamically generated Web pages, some generated by scripts and others coded by hand. Such a site may host hundreds of works by various authors. Each of the modules may comprise various script files and data files. Some files may contain parts of different modules. Some modules may overlap and share procedures. As you can see, when we talk about modules we're talking about functions that can be implemented in various ways. Once one understands the functions, nailing down a specific implementation is pretty easy and largely a matter of programming style.

With reference to FIG. 1, an example of the invention in action will now be described.

First, a display request is received at the first computer 10 from a second computer 12 via the Internet 14. This can happen by a user sitting at the second computer 12 typing in the URL of a Web page stored on the first computer 10. Or maybe the user at the second computer 12 clicked a link on another Web page that took him to the Web page stored on the first computer 10. The display request itself is well known.

Then, in response to the display request, the first computer 10 transmits the work 24 from to the second computer 12 for display on the second computer 12. That is, the Web page containing the work loads on the second computer 12 user's screen. Now the user can browse the Web page and read some or all of the work of literature 24.

Let's say that the user likes the work 24 and thinks that other people will like the work as well. He now wants to buy a keyword that is generally associated with his own Web site. The user navigates to a page that lists the price of the keyword. In this embodiment, the purchase module 20 calculates the price of "shoes" based on its frequency in the work. Such calculation can be real-time or can reference a list of pre-calculated prices stored in a database table or file. Let's say that "shoes" appears five times in the work and costs $10 per appearance. Thus, the user would have to agree to a price of $50 for the word "shoes". The user then fills a form and requests the word "shoes" with the aid of the purchase module 20. The form allows for entry of the user's desired hyperlink, mouse-over text, and image. The purchase request is received and stored by the first computer 10.

Then, once an administrator receives verification of payment for the keyword "shoes", the work 24 is updated by the update module 22 on the first computer 12 to contain hyperlinks on the word "shoes" to the user's Web site and to associate mouse-over text and/or image with the keyword. Updating the work 24 can include generating a static file (e.g., html file) containing the work, and thus can be executed at a convenient time (e.g., 3:00 AM site maintenance). This can be done automatically upon execution of an administration process by the administrator after receiving verification of payment for the keyword.

In another embodiment, updating can be done without any administrator input at all. If payments do not need to be verified by a human administrator, the entire updating process can be fully automated. However, an administrator would then likely want to do a follow-up verification at least for the suitability of hyperlinks to ensure that they do not lead to malicious Web sites or Web sites with illegal material. Keywords can be queued for approval by the administrator. Purchased keywords could either be approved by the administrator after the purchase is confirmed and the work of literature 24 has been updated or before the work of literature 24 is updated.

In another embodiment, the price of the word "shoes" can be determined by its frequency on the Internet. This can be achieved by the purchase module 20 referencing a search engine, such as Google, to obtain a quantity of results (e.g., when Google tells you how many pages are returned for a search).

If, in the above example, the work 24 is a serial novel published in installments, then when the first computer 12 receives a new installment, the update module 22 can update the new installment to contain hyperlinks/mouse-over-text/ images on keywords previously sold. That is, if the purchase of "shoes" entitled the user to all future appearances of "shoes" in latter installment of the novel, then the update module 12 would automatically put the user's hyperlink on all appearances of the word "shoes" in the new installment.

ANOTHER EXAMPLE

Figure 2:
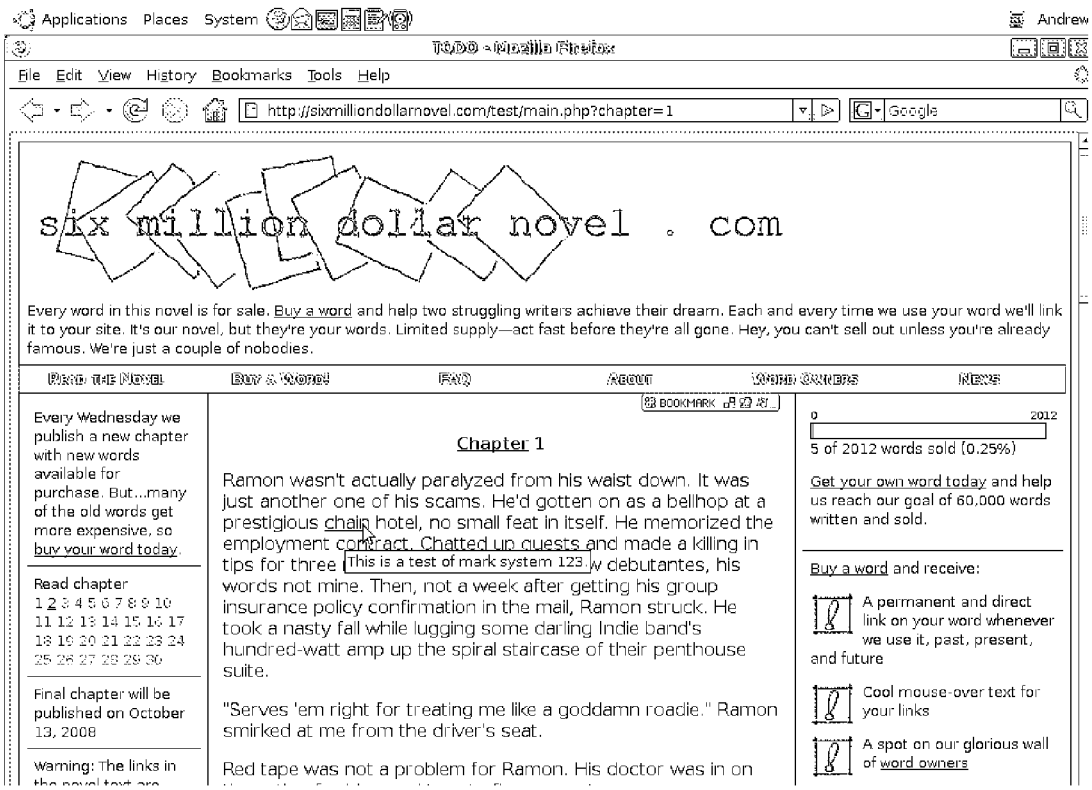
FIG. 2 is a sample main screen generated by the display module of FIG. 1 and showing a first chapter of a work of literature being a fictional novel according to an exemplary embodiment of the present invention.

FIG. 2 illustrates a sample main screen generated by the display module 18 showing a first chapter of a work of literature, being a novel length story according to an exemplary embodiment of the present invention. As shown in FIG. 2, the keywords "chapter" and "chain" have been purchased and therefore have hyperlinks associated with all occurrences of these words in the story. If a reader of the story clicks either of these words, their browser will be directed to the URL provided by the purchaser of the keyword as specified in the purchase request for that keyword. Additionally, if the mouse pointer is hovered over one of the purchased keywords, for example, hovered over the word "chain" as illustrated in FIG. 2, the mouse-over-text supplied by the purchaser in the purchase request is displayed to the reader.

At this point, it's worth noting that in FIGS. 2-8 the operating system and Web browser illustrated are Ubuntu Linux ™ and Firefox ™, respectively. This is exemplary only. Naturally, the invention can be used in conjunction with any operating system and Web browser able to display and allow interaction with Web sites. Internet Explorer TM run under Windows TM is another, equal example. Many mobile devices are also capable of displaying and interacting with Web sites.

As shown in FIG. 2, a new chapter of the work of literature is added every Wednesday in this exemplary embodiment. Any keywords that have been purchased prior to adding the new chapter will automatically include their respective hyperlink and mouse-over-text on all occurrences of that keyword in the new chapters.

FIG. 3 illustrates the list of keywords available for purchase in the novel ordered alphabetically. In this example, the keywords available for purchase are the unique words of the story that have not been purchased already. The price of each keyword is determined according to how many times the word appears in the story at the time of purchase. Each occurrence of the word costs $100 in this example. As shown in FIG. 3, a user is able to see the price of an available keyword by hovering their mouse pointer over the keyword. Note that the price only includes the words in chapters that have been published at the time of purchase. If a purchased keyword is used in a later chapter of the novel, the hyperlink and mouse-over-text will be added at no additional cost. In this way, there is an incentive for advertisers and other buyers of keywords to purchase words as soon as possible because, as additional chapters of the novel are added, the prices of words that are used in the additional chapters will increase. Keywords that have already been sold are shown in red and clicking them will redirect to the more information about who purchased that keyword including the URL and mouse-over-text for the purchased keyword.

In an another embodiment, the list of keywords available for purchase could be ordered either ascending or descending according to the price of the keyword. In still another embodiment, the font size (or some other visual cue) is varied based on the price, frequency, or some other attribute of the word. For example, cheaper words could be shown larger or in a bright, attention grabbing color. Or, common (and arguably uninteresting) words (e.g., a, the, it) could be made faint and small.

FIG. 4 illustrates examples of the appearances of a particular keyword "accident" in the work of literature. In this example, the word "accident" appears 3 times in the story and the specific locations and some surrounding text is shown to the prospective purchaser to help with the purchasing decision. For example, in one embodiment, the purchaser will be an advertiser of a website and will want to purchase words in the work of literature that are related to the product sold on the Web site of the purchaser. Perhaps "accident" would be purchased by a law firm specializing in accident claims. Sometimes words can have different meanings based on context and therefore it is useful to show the purchaser examples of where in the story each occurrence of their chosen keyword appears. Showing contextual occurrences to potential purchasers also assures them that the calculation of the number of occurrences of the word is correct.

FIG. 5 illustrates a form for making a purchase request by the purchaser. In this example, the purchaser is making a reservation on the keyword "above". The word "above" appears one time in the novel so far and therefore costs $100 in this example. Note that the price could be different in other embodiments. As shown in FIG. 5, the following information is required for the purchase request: name, e-mail address, confirmation of e-mail address to avoid typos, web site address URL for hyperlinks, and mouse-over-text. In other embodiments, different information could be requested in the purchase request for such as allowing the user to upload or attach an image for display on the purchased keyword.

FIG. 6 illustrates the confirmation of the purchase request and instructions for how to make payment after receiving the purchase request. For example, after clicking the "reserve above" button in FIG. 5, the user will have secured a reservation on the word "above" and will be given 12 hours to make payment for the word "above" in this example. If they do not make payment within 12 hours, their reservation will expire and other users will be able to make a reservation on this word. Note that the reservation expiry time period can be other durations in other embodiments.

FIG. 7 illustrates a request word page that is generated when someone tries to purchase a word that has already been reserved. In this case, the user is not able to make a reservation but can instead request the word and wait in a queue to see if the word becomes available again due to a lack of payment. A user who wishes to be put on a waiting list for a word that is already reserved can enter the same information that is required in the purchase request form of FIG. 5. If payment is not received during the 12hours (in this example), the request of the word will be converted to a reservation and an e-mail with payment instructions will be sent to the user.

Figure 8:
FIG. 8 illustrates administrator approval of an order of the keyword "above" from the novel of FIG. 2.

FIG. 8 illustrates administrator approval of an order of the keyword "above". In this example, the administrator can see the state of the order in addition to all the information entered by the purchaser in the purchase request. Reasons that the administrator may want to approve an order include ensuring that the mouse-over-text does not contain inappropriate material and ensuring that the URL points to a valid website that would be acceptable to readers of the work of literature. In an another embodiment, the administrator may wish to ensure that the mouse-over-text and the URL relate in some way to the keyword. The administrator approval of the purchase request can occur anytime during the process including before and after payment is received. In one embodiment, all new keyword purchase requests can be queued for approval by an administrator. In another embodiment, administrator approval is bypassed, and if desired, manually performed after the purchased word is linked.

Figure 9:
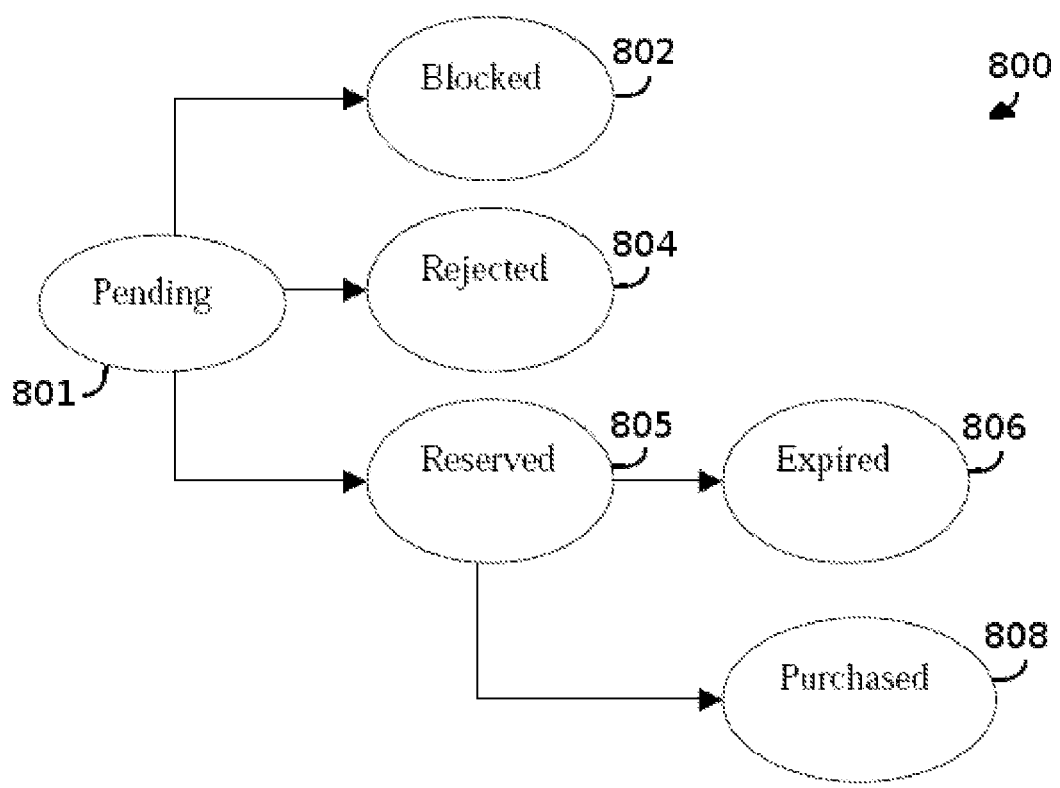
FIG. 9 is a state diagram of orders resulting due to purchase requests of keywords in the novel of FIG. 2.

FIG. 9 illustrates a state diagram 800 for orders that result due to purchase requests of keywords in the work of literature. Note that not all states are required and other additional states can be included. As shown in FIG. 9, the following states are included in this embodiment:

State 801: Pending—This state is the starting state for an order of a keyword that has already been reserved. For example, if the user filled out the request form shown in FIG. 7, their order would be assigned the state of pending. Pending orders have not been approved by the administrator and are pending because somebody else has already reserved the requested word so the administrator is waiting for payment from that somebody else before dealing with this word again.

State 802: Blocked—This state is for an order of a word that was requested by a user after being reserved by someone else, and then the payment was received by the other user. In this case, the order becomes blocked because the word has already been sold. An e-mail to the user to choose a new word can be sent upon entering this state.

State 804: Rejected—This state is for an order of a word that has been rejected by the administrator for some reason, including: bad links, incomplete information, garbage input by robots, inappropriate mouse-over-text or URL links, or other reasons. An e-mail can be sent to the user to make a new order or fix the problem.

State 805: Reserved—This state is the starting state for an order of a word that is awaiting payment. For example, if the user filled out the reservation request form shown in FIG. 5, their order would be assigned the state of reserved. In one embodiment, the purchasers will be given a predetermined time limit to complete the payment process—for example 12 hours.

State 806: Expired—This state is for an order that was reserved but did not receive payment before the reservation time limit elapsed. Therefore, the order was expired at the end of the reservation period and an optional e-mail can be sent to the user to tell them that the order was expired and they should make a new one.

State 808: Purchased—This state is for orders that have received payment and the keyword is now purchased. This user now has their hyperlink, mouse-over-text, and/or image associated with each occurrence of the purchased word in the work of literature.

Note that other embodiments of the present invention also include different indications that a particular keyword has been purchased in the work of literature. These indications can be utilized individually or together, and include but are not limited to: font face, font size, font color, subscripts, superscripts, footnotes, margin notes, sounds, video, animations, or other graphical or text based icons or images. In one embodiment, the indication that a particular keyword has been purchased appears on each occurrence of the keyword in the work of literature. In another embodiment, the indication that a particular keyword has been purchased only appears on the first occurrence of the keyword in the work of literature, or only on the first occurrence of the keyword on a particular page of the work of literature.

Additionally, there is no reason that the present invention be limited to a single work of literature. The inventors anticipate that a single computer could be located on a network hosting a plurality of different works of literature, each work allowing keywords within the work to be sold in exchange for an indication that the keyword has been sold such as a hyperlink or mouse-over-text as specified by a purchaser. In this situation, the keywords of the different works will be independent, and works that are popular will have a continuous stream of readers and advertisers will benefit greatly from advertising within these popular works of literature.

It should also be mentioned that in the above description, once sold, a keyword is forever sold and unavailable to other purchasers. However, this may not be ideal in all cases. For example, a keyword may have been sold a long time ago and therefore be hyperlinked to a Web site that no longer exists. To solve this problem, in another embodiment, keywords in the work of literature can be made purchasable for a predetermined period of time, for a predetermined number of clicks, or for a predetermined number of impressions. Once the predetermined limit has been reached, the keyword then becomes available for purchase again. Alternatively, an automated or manual process can be periodically performed to check for the validity of the hyperlinks (for example). If a hyperlink is found to be invalid, for example due to linking to a non-existent website or missing page, the respective keyword in the work of literature can be made available for purchase again.

According to the present invention, works of literature can be published online taking advantage of the low costs of transmission of data across computer networks while still generating profits for their authors. Readers can freely read the work of literature, and there will therefore be no reason to pirate the work of literature by end users. Additionally, the more readers, the more incentive for advertisers to purchase words or word phrases utilized within the work of literature for advertising purposes. By updating the work of literature to include an indication that a particular word has been purchased, such as a hyperlink or mouse-over-text on a purchased keyword, advertisers will receive product placement within the work of literature. Because of the wide variety of words and phrases in a typical work of literature, there will be plenty of opportunity for advertisers to purchase keywords that are related in context to their product(s). Readers will also be curious to see who purchased words in the work of literature, which further benefits the advertisers.

What is claimed is:

1. A method of publishing a work of literature on a network, the method comprising:

storing a published portion of the work of literature on a computer, the published portion including only a first part of the work of literature, wherein there are one or more additional installments of the work of literature not yet included in the published portion, the one or more additional installments to be added to the published portion at one or more later times;

transmitting, by the computer, the published portion to a device via the network, whereby a user of the device is enabled to read the published portion;

receiving, by the computer, a purchase request for a keyword that appears in the published portion;

determining, by the computer, a price for the keyword, wherein the price is based on how many times the keyword appears in the published portion;

updating, by the computer after confirming payment for the purchase request, the published portion to include an indication that the keyword has been sold to a purchaser for at least one appearance of the keyword in the published portion, the indication comprising a hyperlink on the at least one appearance of the keyword that when clicked will direct a web browser to a destination URL as specified by the purchaser;

transmitting, by the computer, the published portion as updated to the device via the network, whereby the user of the device is enabled to read the published portion and now sees the hyperlink on the at least one appearance of the keyword in the published portion;

adding, by the computer at a later time after the keyword has been sold, a new installment of additional words to the published portion, the new installment including at least one appearance of the keyword;

updating, by the computer, the new installment to include the indication that the keyword has been sold for the at least one appearance of the keyword in the new installment at no additional monetary cost to the purchaser of the keyword; and transmitting, by the computer, the new installment to the device via the network, whereby the user of the device is enabled to read the new installment and sees the hyperlink on the at least one appearance of the keyword in the new installment.

2. The method of claim 1, further comprising updating the published portion after adding the new installment to include the indication that the keyword has been sold for every appearance of the keyword in the published portion at no additional monetary cost to the purchaser of the keyword.

3. The method of claim 1, further comprising updating the published portion after adding the new installment to include the indication that the keyword has been sold for at least one appearance of the keyword on each page of the published portion at no additional monetary cost to the purchaser of the keyword; wherein the published portion includes a plurality of pages.

4. The method of claim 1, wherein the work of literature comprises text of a web page and the new installment comprises new text added to the web page.

5. The method of claim 1, wherein the work of literature comprises an e-book and the new installment comprises a new chapter of the e-book.

6. The method of claim 1, wherein the indication that the keyword has been purchased includes information that is displayed when a user of the device moves a pointer over the keyword.

7. The method of claim 6, wherein additional information related to the indication that the keyword has been purchased appears in a margin area independent of the information.

8. The method of claim 1, further comprising:
periodically adding a new installment of additional words to the published portion; and
updating the published portion after adding each new installment to include the indication that the keyword has been sold for at least one appearance of the keyword in the published portion at no additional monetary cost to the purchaser of the keyword.

9. The method of claim 8, further comprising updating the published portion after adding each new installment to include the indication that the keyword has been sold for every appearance of the keyword in the published portion at no additional monetary cost to the purchaser of the keyword.

10. A system having at least one computer coupled to a network, the at least one computer configured to:

store a published portion of a work of literature, the published portion including only a first part of the work of literature, wherein there are one or more additional installments of the work of literature not yet included in the published portion, the one or more additional installments to be added to the published portion at one or more later times;

transmit the published portion to a device via the network, whereby a user of the device is enabled to read the published portion;

receive a purchase request for a keyword that appears in the published portion;

determine a price for the keyword, wherein the price is based on how many times the keyword appears in the published portion;

confirm payment for the purchase request and then update the published portion to include an indication that the keyword has been sold to a purchaser for at least one appearance of the keyword in the published portion, the indication comprising a hyperlink on the at least one appearance of the keyword that when clicked will direct a web browser to a destination URL as specified by the purchaser;

transmit the published portion as updated to the device via the network, whereby the user of the device is enabled to read the published portion and now sees the hyperlink on the at least one appearance of the keyword in the published portion;

at a later time after the keyword has been sold, add a new installment of additional words to the published portion, the new installment including at least one appearance of the keyword;

update the new installment to include the indication that the keyword has been sold for the at least one appearance of the keyword in the new installment at no additional monetary cost to the purchaser of the keyword; and transmit the new installment to the device via the network, whereby the user of the device is enabled to read the new installment and sees the hyperlink on the at least one appearance of the keyword in the new installment.

11. The system of claim 10, wherein the at least one computer is further configured to update the published portion after adding the new installment to include the indication that the keyword has been sold for every appearance of the keyword in the published portion at no additional monetary cost to the purchaser of the keyword.

12. The system of claim 10, wherein the at least one computer is further configured to update the published portion after adding the new installment to include the indication that the keyword has been sold for at least one appearance of the keyword on each page of the published portion at no additional monetary cost to the purchaser of the keyword; wherein the published portion includes a plurality of pages.

13. The system of claim 10, wherein the work of literature comprises text of a web page and the new installment comprises new text added to the web page.

14. The system of claim 10, wherein the work of literature comprises an e-book and the new installment comprises a new chapter of the e-book.

15. The system of claim 10, wherein the indication that the keyword has been purchased includes information that is displayed when a user of the device moves a pointer over the keyword.

16. The system of claim 10, wherein the at least one computer is further configured to:
periodically add a new installment of additional words to the published portion; and update the published portion after adding each new installment to include the indication that the keyword has been sold for at least one appearance of the keyword in the published portion at no additional monetary cost to the purchaser of the keyword.

17. The system of claim 16, wherein the at least one computer is further configured to update the published portion after adding each new installment to include the indication that the keyword has been sold for every appearance of the keyword in the published portion at no additional monetary cost to the purchaser of the keyword.

18. A server coupled to a network, the server comprising:
means for storing a published portion of a work of literature on a computer, the published portion including only a first part of the work of literature, wherein there are one or more additional installments of the work of literature not yet included in the published portion, the one or more additional installments to be added to the published portion at one or more later times;
means for transmitting the published portion to a device via the network, whereby a user of the device is enabled to read the published portion;
means for receiving a purchase request for a keyword that appears in the published portion;
means for determining a price for the keyword, wherein the price is based on how many times the keyword appears in the published portion;
means for updating, after confirming payment for the purchase request, the published portion to include an indication that the keyword has been sold to a purchaser for at least one appearance of the keyword in the published portion, the indication comprising a hyperlink on the at least one appearance of the keyword that when clicked will direct a web browser to a destination URL as specified by the purchaser;
means for transmitting the published portion as updated to the device via the network, whereby the user of the device is enabled to read the published portion and now sees the hyperlink on the at least one appearance of the keyword in the published portion;
means for adding, at a later time after the keyword has been sold, a new installment of additional words to the published portion, the new installment including at least one appearance of the keyword;
means for updating the new installment to include the indication that the keyword has been sold for at least one appearance of the keyword in the new installment at no additional monetary cost to the purchaser of the keyword; and
means for transmitting the new installment to the device via the network, whereby the user of the device is enabled to read the new installment and sees the hyperlink on the at least one appearance of the keyword in the new installment.

19. The method of claim 6, wherein the destination URL for the hyperlink and the information to display over the keyword are specified by the purchaser in the purchase request.

20. The system of claim 15, wherein the destination URL for the hyperlink and the information to display over the keyword are specified by the purchaser in the purchase request.

* * * * *